US011084257B2

(12) United States Patent
Düpre

(10) Patent No.: US 11,084,257 B2
(45) Date of Patent: Aug. 10, 2021

(54) POLYMER FILM FOR IN-MOULD LABELLING

(71) Applicant: Treofan Germany GmbH & Co. KG, Neunkirchen (DE)

(72) Inventor: Yvonne Düpre, Enkenbach-Alsenborn (DE)

(73) Assignee: TREOFAN GERMAN GMBH & CO. KG

( * ) Notice: Subject to any disclaimer, the term of this patent is extended or adjusted under 35 U.S.C. 154(b) by 416 days.

(21) Appl. No.: 15/885,213

(22) Filed: Jan. 31, 2018

(65) Prior Publication Data

US 2018/0207915 A1  Jul. 26, 2018

Related U.S. Application Data

(62) Division of application No. 14/413,567, filed as application No. PCT/EP2013/002030 on Jul. 10, 2013, now Pat. No. 9,895,865.

(30) Foreign Application Priority Data

Jul. 11, 2012 (EP) .................................... 12005126

(51) Int. Cl.
| B32B 27/08 | (2006.01) |
| B29C 48/18 | (2019.01) |
| B32B 27/20 | (2006.01) |
| B32B 27/32 | (2006.01) |
| B29C 51/16 | (2006.01) |
| B32B 3/26 | (2006.01) |
| G09F 3/04 | (2006.01) |
| B29C 49/24 | (2006.01) |
| B32B 3/30 | (2006.01) |
| B29L 31/00 | (2006.01) |
| B29K 23/00 | (2006.01) |
| B29K 25/00 | (2006.01) |
| B29C 49/04 | (2006.01) |
| B29L 9/00 | (2006.01) |

(52) U.S. Cl.
CPC ............. *B32B 27/08* (2013.01); *B29C 48/18* (2019.02); *B29C 49/2408* (2013.01); *B29C 51/16* (2013.01); *B32B 3/26* (2013.01); *B32B 3/30* (2013.01); *B32B 27/20* (2013.01); *B32B 27/32* (2013.01); *G09F 3/04* (2013.01); *B29C 49/04* (2013.01); *B29C 2049/241* (2013.01); *B29C 2049/2414* (2013.01); *B29C 2049/2429* (2013.01); *B29C 2791/006* (2013.01); *B29K 2023/06* (2013.01); *B29K 2023/12* (2013.01); *B29K 2025/06* (2013.01); *B29L 2009/00* (2013.01); *B29L 2031/744* (2013.01); *B32B 2250/05* (2013.01); *B32B 2250/242* (2013.01); *B32B 2264/102* (2013.01); *B32B 2264/104* (2013.01); *B32B 2270/00* (2013.01); *B32B 2307/4026* (2013.01); *B32B 2307/41* (2013.01); *B32B 2307/518* (2013.01); *B32B 2519/00* (2013.01); *Y10T 428/24355* (2015.01)

(58) Field of Classification Search
None
See application file for complete search history.

(56) References Cited

U.S. PATENT DOCUMENTS

| 5,326,625 A * | 7/1994 | Schuhmann ............. C08K 3/26 428/215 |
| 5,516,563 A | 5/1996 | Schuhmann et al. |
| 5,618,369 A | 4/1997 | Peiffer et al. |
| 2010/0326590 A1 | 12/2010 | Roth et al. |
| 2011/0214794 A1 | 9/2011 | Kochem et al. |
| 2012/0058304 A1 | 3/2012 | Jung et al. |

FOREIGN PATENT DOCUMENTS

| DE | 3940173 | 6/1991 |
| DE | 4313430 | 11/1994 |
| EP | 0545650 A1 | 6/1993 |
| EP | 0611102 A1 | 8/1994 |
| EP | 0862991 A2 | 9/1998 |
| EP | 1224069 | 7/2002 |
| WO | 200009329 | 2/2000 |
| WO | 2002045956 | 6/2002 |
| WO | WO-2009/010178 A1 | 1/2009 |
| WO | WO-2009/052921 A1 | 4/2009 |
| WO | WO-2010121802 A1 | 10/2010 |

OTHER PUBLICATIONS

International Search Report for PCT/EP2013/002030 dated Aug. 20, 2013.

(Continued)

*Primary Examiner* — Monica A Huson
(74) *Attorney, Agent, or Firm* — McDonald Hopkins LLC

(57) ABSTRACT

The invention relates to a multi-layered, opaque, biaxially-oriented polyolefin film with a thickness of less than 150 mum and which comprises f. a base layer that contains vacuoles and at least one polymer of at least one olefin, g. an inner intermediate layer that contains at least one polymer of at least one olefin, h. an outer intermediate layer that contains at least one polymer of at least one olefin, i. an inner cover layer which is in contact with the inner intermediate layer and contains 5-70 wt. % of at least one polyethylene and 30-95 wt. % of at least one propylene polymer, and j. an outer cover layer which is in contact with the outer intermediate layer and contains 5-70 wt. % of at least one polyethylene and 30-95% of at least one propylene polymer, each amount indication relating to the weight of the layer in question, and characterised in that said outer intermediate layer has a thickness of 0.5 to 5 mum and contains 4.5 to 30 wt. % of pigments, preferably Tau[Iota]Omicron2, in that the outer cover layer has a thickness of >0 to <2 mum, and in that the film has a gloss on either side of less than 50 gloss units measured according to DIN EN ISO 2813 at an angle of 60 DEG and at a temperature of 25 DEG C.

17 Claims, No Drawings

(56) References Cited

OTHER PUBLICATIONS

International Preliminary Report on Patentability for PCT/EP2013/002030 dated Jan. 13, 2015.
International Preliminary Report on Patentability from corresponding PCT/EP2013/002030 dated Jan. 13, 2015.

* cited by examiner

POLYMER FILM FOR IN-MOULD LABELLING

CROSS-REFERENCE TO RELATED APPLICATIONS

This application is a divisional application of U.S. patent application Ser. No. 14/413,567, filed Jan. 8, 2015, which is incorporated by reference in its entirety. Application Ser. No. 14/413,567 is a national stage application (under 35 U.S.C. § 371) of PCT/EP2013/002030, filed Jul. 10, 2013, which claims benefit of European Application No. 12005126.3, filed Jul. 11, 2012, both of which are incorporated herein by reference in their entirety.

The present invention relates to a polymer film for in-mould labelling (IML) and also to a method for testing the destacking behaviour of label films.

Label films cover a comprehensive and technically complex field. A distinction is made between different labelling techniques, which are fundamentally different in terms of the process conditions and inevitably place different technical demands on the label materials. A feature common to all labelling processes is that containers labelled in a visually appealing manner must be produced as the end results, wherein good adhesion on the labelled container must be ensured.

A wide of techniques for applying the label are used in labelling methods. A distinction is made between self-adhesive labels, wrap-around labels, shrink labels, in-mould labels, patch labelling, etc. The use of a film made of a thermoplastic as label is possible in all these various labelling methods.

Also in the case of in-mould labelling, a distinction is made between various techniques in which different method conditions are applied. A feature common to all in-mould labelling methods is that the label participates in the actual shaping method of the container and is applied during this method. However, very different shaping methods are used here, such as injection moulding methods, blow moulding methods and thermoforming methods.

In all in-mould labelling methods, individual labels are placed in the respective mould. Consequently, the separability (destackability) of the labels is a critical factor for the efficiency of the entire labelling process. This can be improved where appropriate by addition of powder, which is applied to the generally printed label and acts as a spacer so to speak.

However, the destackability also plays a key role already when printing the label films. For cost reasons, the films for printing are first cut into large-size sheets, onto which a number of templates are printed side by side. In this printing process, the stacked sheets are also separated at very high speeds of at least 1000 sheets per hour. The individual labels are then punched out from the printed sheets and are also stacked in turn. For economical reasons it is desirable to place as many printed images as possible on a sheet, in other words the larger the sheet the lower the printing costs. However, this optimisation has limitations. The larger the sheets, the more difficult it is to handle the film sheets at high speeds, and in particular the sheets no longer can be reliably separated at high destacking speeds when introduced into the printing machine.

In the case of a sheet-fed printing method, the unprinted film (to be printed) thus has to enable a movement of the individual film sheets relative to one another, in particular for destacking when the film sheet stack is fed to the printing machine, for shingling during the printing process, or for "jiggling" of the film sheet stack so that this is flush.

Since, in a film stack, relatively high weights act on the sheets arranged at the bottom compared with the weights acting on the sheets arranged thereabove, the movement of the individual film layers must also be ensured at relatively high pressure.

EP 0 545 650 B1 describes a polymer film that has five coextruded layers biaxially stretched together and a vacuole-containing core layer made of polypropylene homopolymer with intermediate layers arranged on either side made of substantially vacuole-free polypropylene homopolymer, and also has an outer layer made of heat-sealable polymer on each of the intermediate layers made of substantially vacuole-free polypropylene homopolymer. The film is heat-sealable, wherein the intermediate layers made of polypropylene homopolymer each have a thickness from 1 to 5 μm. Here, the polymer film is to be characterised by good puncture strength. In one exemplary embodiment, a polymer film having a density of 0.66 g/cm3, an optical density of 0.61 and a gloss of 50 at 20° is described.

The document does not provide any details of the gloss of the film at 60°. However, it is to be assumed on the basis of correlations known from the literature that with a gloss of 50 gloss units at 20°, more than 70 gloss units are to be expected at an angle of 60°.

EP 0 611 102 B1 discloses a biaxially oriented polypropylene film comprising a vacuole-containing base layer made of polypropylene homopolymer having an intermediate layer of vacuole-free polypropylene homopolymer on one surface and a printable outer layer on the vacuole-free polypropylene homopolymer intermediate layer. Here, the printable outer layer is formed from a polyolefin mixed polymer which is formed from ethylene units, propylene units, but-1-ene units and higher α-olefin units. In addition, at least one further polymer layer of which the outer surface is matt and comprises a mixture of incompatible polymers is also located on the surface opposite the vacuole-free intermediate layer. Furthermore, the inner layer and/or the vacuole-free layer contains/contain titanium dioxide.

The film in this document is used inter alia for in-mould labelling.

In the description, this document indicates that the use of a matt surface prevents the adhesion of the printable layer thereto. Such labels made of this film are thus less likely to stick together when a label is removed from a label stack, for example by suctioning of the printable surface of the labels. However, this document does not provide any specifications regarding the gloss of the film.

EP 0 862 991 B1 concerns the use of a label as an in-mould label which is produced from a biaxially oriented polymer film having a core layer made of a vacuole-containing propylene homopolymer with a density of up to 0.70 g/cm³ on any surface of the core layer of at least one substantially vacuole-free layer. The ratio of the combined layer thickness of the intermediate layers and/or cover layers on the respective surfaces of the core layer is between 2:1 and 1:1. However, this document does not provide any specifications regarding the gloss of the film.

WO 2009/010178 A1 describes the use of a multi-layer, opaque, biaxially oriented polyolefin film formed from a vacuole-containing base layer and at least one inner cover layer as an in-mould label in the case of thermoforming. Here, the cover layer comprises at least 30-95% by weight of a co- and/or terpolymer I with a seal initiation temperature I of 70-105° C. and 5 to 70% by weight of an incompatible polyethylene, wherein the values in % by weight each relate to the weight of the inner cover layer. The seal initiation temperature II of the inner cover layer is to lie in this context in the range from 80 to 110° C.

However, this document does not provide any details regarding the gloss of the film.

On this basis, the problem addressed by the present invention was that of specifying an improved in-mould labelling method. The destackability of the labelling films is to be improved and is to thus contribute to the improvement of the space-time yield, that is to say the improved labelling film is to enable a higher method speed during printing or interruption-free handling of larger sheets and/or is to enable a higher method speed in the case of in-mould labelling as a result of improved destackability of the printed labels.

Here, particular attention is placed on an improvement of the destackability of conventional unprinted film sheets so that these can be printed as efficiently as possible, in particular in sheet-fed printing methods. The destackability is therefore to be improved in two ways: firstly the separation or destackability of the printed label in the case of the in-mould process and also secondly the handling of the film sheets during printing. For this good handling, a reliable destackability of the sheets and shingling without uncontrolled shifting of the film layers (expulsion) are necessary, as well as a correct stacking of the sheets so that a cleaner feed to the printing machine is enabled.

The efficiency of the entire in-mould labelling method is thus to be improved. The other properties of the known in-mould labels should not be adversely affected where possible, but in contrast should be improved further where possible. Lastly, the solution according to the invention should be realisable on a large scale in a comparably simple manner and cost-effectively. Lastly, it would be desirable for the label films possessing these advantageous destacking properties to be well suited for use in various shaping processes, such as injection moulding and thermoforming.

A further problem addressed by the present invention is that of providing a film testing method which makes it possible in practice to draw reliable conclusions regarding the destacking behaviour of film sheets or labels. In accordance with the known teaching, an increased roughness contributes to improved destacking. However, this piece of knowledge does not enable differentiated assessment of films having similar roughness values, although it has been found in practice that, in the case of destacking (both the sheets and the printed label films), significant differences may occur in spite of similar roughness values.

These and other problems addressed by the present invention, which will become clear directly from the relationships discussed in this application, are solved by a film according to Patent claim 1. The dependent claims referring to claim 1 describe particularly advantageous embodiments of the film according to the invention. The remaining claims protect preferred fields of application of the film according to the invention.

Due to the provision of a multi-layered, opaque, biaxially oriented polyolefin film with a thickness of less than 150 μm, comprising a. a vacuole-containing base layer containing at least one polymer of at least one olefin,
b. an inner intermediate layer containing at least one polymer of at least one olefin,
c. an outer intermediate layer containing at least one polymer of at least one olefin,
d. an inner cover layer, which is in contact with the inner intermediate layer and contains 5-70% by weight of at least one polyethylene and also 30-95% by weight of at least one propylene polymer, and
e. an outer cover layer, which is in contact with the outer intermediate layer and contains 5-70% by weight of at least one polyethylene and also 30-95% by weight of at least one propylene polymer,
wherein the specified quantities in each case relate to the weight of the respective layer, and
the outer intermediate layer has a thickness from 0.5 to 5 μm and contains 4.5 to 30% by weight of pigments, preferably $TiO_2$, and
the outer cover layer has a thickness from >0 to 2 μm, and
wherein the film on both sides has a gloss of less than 50 gloss units measured in accordance with DIN EN ISO 2813 at an angle of 60° and at a temperature of 25° C.,
it is possible to achieve a significant improvement of the known in-mould labelling methods in a manner not readily foreseeable.

In accordance with the invention, an improved destackability of the individual labels is made possible in particular and leads in the in-mould labelling methods to a considerable improvement of the space-time yields.

The good destackability of the unprinted film sheets enables an improved handling of the film sheets during the printing process and therefore an extremely efficient printing of the film sheets according to the invention, in particular in the sheet-fed printing method, which in turn improves the efficiency of the in-mould labelling method as a whole. The other properties of the films are not adversely influenced within the scope of the present invention, but are improved further. For example, the printability and the colour adhesion of the film are not impaired. The visual appearance and the haptics of the label itself and of the labelled container are improved. Lastly, the solution according to the invention can be implemented in a comparably simple manner on a large scale and cost-effectively in existing in-mould labelling methods.

The present invention accordingly relates to a multi-layered, opaque, biaxially oriented polyolefin film, comprising a. a vacuole-containing base layer,
b. an inner intermediate layer, which is in contact with the inner cover layer,
c. an outer intermediate layer, which is in contact with the outer cover layer,
d. an inner cover layer, and
e. an outer cover layer.

Base Layer

The base layer of the film contains at least one polymer of at least one olefin, expediently at least one propylene polymer, in particular at least one propylene homopolymer. The proportion of the polymer is favourably at least 70% by weight, preferably 75 to 99% by weight, and in particular 80 to 98% by weight, in each case in relation to the weight of the base layer.

The propylene polymer generally contains at least 90% by weight, preferably 94 to 100% by weight, and in particular 98 to <100% by weight, of polypropylene units. The corresponding comonomer content of at most 10% by weight or 0 to 6% by weight or >0 to 2% by weight respectively is generally derived, when present, from ethylene. The values in % by weight in each case relate to the propylene polymer.

Isotactic propylene homopolymers with a melting point from 140 to 170° C., preferably from 150 to 165° C., and a melt flow index (measurement ISO 1133 at 2.16 kg load and 230° C.) from 1.0 to 10 g/10 min, preferably from 1.5 to 6.5 g/10 min, are preferred. The n-heptane soluble proportion of the polymer is generally 0.5 to 10% by weight, preferably 2 to 5% by weight, in relation to the starting polymer. The molecular weight distribution of the propylene polymer can vary. The ratio of the weight average Mw to the number average Mn is generally between 1 and 15, preferably 2 to 10, even more preferably 2 to 6. Such a narrow molecular weight distribution of the propylene polymer of the base layer is achieved for example by the peroxide degradation thereof or by preparation of the polypropylene by means of suitable metallocene catalysts. For the purposes of the present invention, highly isotactic or highly crystalline polypropylenes are also suitable, of which the isotacticity according to $^{13}$C-NMR (triads) is at least 95%, preferably 96-99%. Highly isotactic polypropylenes of this type are known per se in the prior art and are referred to both as HIPP and as HCPP.

It has been found within the scope of the present invention that the films then also have the previously described good properties when the base layer is not constructed from highly isotactic or highly crystalline propylene homopolymers of this type. Propylene homopolymers having a regular isotacticity ($^{13}$C-NMR, triads) from 90 to 96%, preferably 92 to <95%, can thus also be used.

Furthermore, the base layer comprises vacuole-initiating fillers, in particular in a quantity of at most 30% by weight, preferably 1 to 20% by weight, in particular 2 to 15% by weight, in relation to the weight of the base layer. In addition to the vacuole-imitating fillers, the base layer may contain pigments, for example in a quantity from 0.5 to 10% by weight, preferably 1 to 8% by weight, in particular 1 to 5% by weight. The values relate in each case to the weight of the base layer. Preferred embodiments contain no pigments, that is to say <1% by weight, in particular no $TiO_2$, in the base layer.

"Pigments" in the sense of the present invention are incompatible particles that substantially do not lead to vacuole formation during orientation of the film. The colouring effect of the pigments is caused by the particles themselves. Pigments generally have a mean particle diameter from 0.01 to at most 1 μm, preferably 0.01 to 0.7 μm, in particular 0.01 to 0.4 μm. Pigments comprise both what are known as "white pigments", which stain the films white, and also "coloured pigments", which provide the film with a chromatic or black colour. Conventional pigments are materials such as aluminium oxide, aluminium sulphate, barium sulphate, calcium carbonate, magnesium carbonate, silicates such as aluminium silicate (kaolinite) and magnesium silicate (talc), silicon dioxide, and titanium dioxide, among which white pigments such as calcium carbonate, silicon dioxide, titanium dioxide and barium sulphate are preferably used.

The titanium dioxide particles generally consist in a proportion of at least 95% by weight of rutile and are preferably used with a coating formed from inorganic oxides and/or from organic compounds having polar and unpolar groups. Such coatings of the $TiO_2$ are known in the prior art.

In the sense of the present invention, "vacuole-initiating fillers" are solid particles that are incompatible with the polymer matrix and that lead to the formation of vacuole-like cavities as the films are oriented, wherein size, type and number of vacuoles are dependent on the size and the quantity of the solid particles and the stretching conditions, such as stretch ratio and stretch temperature. The vacuoles reduce the density and give the films a characteristic pearl-like, opaque appearance, which is produced by light scattering at the "vacuole/polymer matrix" interfaces. The light scattering on the solid particles generally contributes relatively little to the opacity of the film. The vacuole-initiating fillers generally have a minimum size of 1 μm, in order to lead to an effective quantity, that is to say opaque-making quantity, of vacuoles. The mean particle diameter of the particles is generally 1 to 6 μm, preferably 1.5 to 5 μm.

The chemical nature of the particles plays a subordinate role if incompatibility is present.

Conventional vacuole-initiating fillers are inorganic and/or organic materials incompatible with polypropylene, such as aluminium oxide, aluminium sulphate, barium sulphate, calcium carbonate, magnesium carbonate, silicates such as aluminium silicate (kaolinite) and magnesium silicate (talc), and silicon dioxide, from which calcium carbonate and silicon dioxide are preferably used. The conventionally used polymers incompatible with the polymer of the base layer can be considered as organic fillers, in particular those such as HDPE, copolymers of cyclic olefins, such as norbornene or tetracyclododecene, with ethylene or propylene, polyester, polystyrenes, polyamides, halogenated organic polymers, wherein polyesters, such as polybutylene terephthalates, are preferred. "Incompatible materials" or "incompatible polymers" within the sense of the present invention denote materials or polymers that are present in the film as separate particles or as separate phases.

The density of the film according to the invention can vary within a wide range depending on the composition of the base layer. Here, vacuoles contribute to a lowering of the density, whereas pigments, for example $TiO_2$, increase the density of the film on account of the higher specific weight. The density of the film preferably lies in the range from 0.4 to 0.8 g/cm$^3$, in particular in the range from 0.5 to 0.75 g/cm$^3$.

In addition, the base layer can contain conventional additives, such as neutralising agents, stabilisers, antistatic agents and/or lubricants, in each case in effective quantities. The values below in % by weight relate in each case to the weight of the base layer.

Preferred antistatic agents are glycerol monostearates, alkali alkane sulfonates, polyether-modified, in particular ethoxylated and propoxylated, polydiorganosiloxanes (polydialkylsiloxanes, polyalkylphenylsiloxanes and the like) and/or the substantially straight-chained and saturated aliphatic, tertiary amines with an aliphatic molecular group containing 10 to 20 carbon atoms, which are substituted with α-hydroxy-($C_1$-$C_4$)alkyl groups, wherein N,N-bis-(2-hydroxyethyl)alkyl amines containing 10 to 20 carbon atoms, preferably 12 to 18 carbon atoms, in the alkyl molecular group are particularly suitable. The preferred quantity of antistatic agent lies in the range from 0.05 to 0.5% by weight.

In particular, higher aliphatic acid amides, higher aliphatic acid esters, waxes and metal soaps and also polydimethylsiloxanes are particularly suitable as lubricants. The preferred quantity of lubricant lies in the range from 0.01 to 3% by weight, preferably 0.02 to 1% by weight. The addition of higher aliphatic acid amides is particularly preferably in the range from 0.01 to 0.25% by weight in the base layer. Aliphatic acid amides that are even more particularly suitable are erucic acid amide and stearyl amide.

The conventional compounds having a stabilising effect for ethylene, propylene and other olefin polymers can be used as stabilisers. The added quantity of these compounds preferably lies between 0.05 and 2% by weight. Phenolic and phosphitic stabilisers, such as tris-2,6-dimethylpheniylphosphite, are particularly suitable. Phenolic stabilisers, with a molar mass of more than 500 g/mol are preferred, in particular pentaerythrityl-tetrakis-3-(3,5-di-tertiary-butyl-4-hydroxy-phenyl) propionate or 1,3,5-trimethyl-2,4,6-tris(3,5-di-tertiary-butyl-4-hydroxybenzyl)benzene. Here, phenolic stabilisers are used alone expediently in a quantity from 0.1 to 0.6% by weight, in particular 0.1 to 0.3% by weight, and phenolic and phosphitic stabilisers are used preferably in a ratio of 1:4 to 2:1 and in a total quantity from 0.1 to 0.4% by weight, in particular 0.1 to 0.25% by weight.

Preferred neutralising agents include dihydrotalcite, calcium stearate and/or calcium carbonate with a mean particles size of at most 0.7 μm, an absolute particle size of less than 10 μm and a specific surface of at least 40 m²/g. Generally, 0.02 to 0.1% by weight are added.

Cover Layers

Besides the base layer, the film according to the invention comprises an inner cover layer and an outer cover layer. In the sense of the present invention, the inner cover layer is the cover layer that faces the container during labelling and forms the connection between the container and the label during labelling. The inner cover layer is in contact with the inner intermediate layer. In the sense of the present invention, the outer cover layer is the cover layer that faces away from the container during labelling and points outwardly during labelling and is visible on the labelled container. The outer cover layer is in contact with the outer intermediate layer.

The inner cover layer and the outer cover layer contain, in each case independently of one another, at least one propylene polymer, preferably a propylene homopolymer, and/or at least one propylene copolymer, that is to say a mixed polymer formed from two, three or more different olefin units, for example propylene with polyethylene units and/or polybutylene units, and a polyethylene. The inner cover layer and the outer cover layer generally contain, in each case independently of one another, at least 30 to 95% by weight, preferably 45 to 85% by weight, in particular 50 to 80% by weight, of the at least one propylene polymer and 5 to 70% by weight, preferably 15 to 55% by weight, in particular 20 to 50% by weight, of the polyethylene, in each case in relation to the weight of the respective layer.

For the present purpose, particularly suitable propylene copolymers comprise polyethylene units and/or polybutylene units, in particular ethylene-propylene copolymers, propylene-butylene copolymers and ethylene-propylene-butylene terpolymers. The composition of the propylene copolymers from the respective monomers can vary within the limits described below. The propylene copolymers generally contain more than 50% by weight polypropylene units. Preferred propylene copolymers contain at least 60% by weight, preferably 65 to 97% by weight, polypropylene units and at most 40% by weight, preferably 3 to 35% by weight, polyethylene or polybutylene comonomer units. Furthermore, mixed polymers or terpolymers are also particularly advantageous which comprise 65 to 96% by weight, preferably 72 to 93% by weight, polypropylene units, and 3 to 34% by weight, preferably 5 to 26% by weight, polyethylene units and 1 to 10% by weight, preferably 2 to 8% by weight, polybutylene units.

Where appropriate, the above-mentioned propylene polymers can be mixed with one another. Here, the proportions can be varied within arbitrary limits, provided the other specifications of the present invention, in particular in respect of the gloss and possibly the roughness of the film, are met on both sides. These mixtures are then used in the above-described quantities.

It is essential to the invention that the proportions of the at least one propylene copolymer and of the at least one polyethylene for the inner cover layer and the outer cover layer are each selected from the specified ranges such that the gloss of the resultant film on both sides, measured according to DIN EN ISO 2813 at an angle of 60° and at a temperature of 25° C., is less than 50 gloss units, preferably less than 40 gloss units.

Mixtures of propylene polymers and polyethylenes are known per se in the prior art. The polyethylenes incompatible with the propylene polymers produce a surface roughness that lends the films a matt appearance in principle. To maintain the gloss values, the proportions of polyethylene in the respective cover layer can be varied, wherein the gloss is generally reduced by higher polyethylene proportions.

Where appropriate, further measures, such as surface treatment, and additives are to be selected such that these specifications for the gloss are met. Generally, a corona treatment and additives, such as antiblocking agents, cause a further reduction of the gloss.

The melt index of the propylene copolymers is generally 0.1 to 20 g/10 min (230° C., 2.16 kg), preferably 0.1 to 15 g/10 min. The melting point may lie generally in a range from 70 to 140° C. In a preferred embodiment, propylene copolymers are used of which the melting point is at least 105 to 140° C., preferably 110 to 135° C. These embodiments are characterised by a particularly good workability both of the production and with the use of the film.

For films that are to be used as labels in thermoforming methods, propylene polymers with a low seal initiation temperature are preferred for the inner cover layer. Both these low-sealing propylene polymers and also the composition of such low-sealing inner cover layers are described in detail in WO 2009/010178, page 9, line 19 to page 13, line 12. This disclosure is hereby incorporated expressly by reference. For the thermoforming chains, propylene polymers that have a seal initiation temperature I of 70-105° C., preferably 75 to 100° C., are thus preferred. The proportions of these low-sealing Co- and/or terpolymers I and polyethylene in the inner cover layer should be selected such that the seal initiation temperature of the inner cover layer does not exceed 110° C., and preferably lies in the range of 80-110° C.

The second component of the inner cover layer and of the outer cover layer essential to the invention is at least one polyethylene which is incompatible with the above-described propylene copolymers. In this context, "incompatible" means that a surface roughness is formed by the mixture of the at least one propylene polymer with the at least one polyethylene. The surface roughness Rz of the respective surface generally lies in a range of 2.0-6 μm, preferably 2.5-4.5 μm, with a cutoff of 0.25 mm. The Rz values for surface roughness on each side should preferably differ by at most 2 μm, wherein similar roughnesses on both surfaces have proven to be advantageous for the destackability. The difference between the higher and the lower roughness Rz should thus lie preferably between 0 and 1.8 μm in particular between >0 and <1.5 μm.

Suitable polyethylenes are, for example, HDPE or MDPE. HDPE generally has the properties described below, for example an MFI (21.6 kg/190° C.) of greater than 1 to 50 g/10 min, preferably 1.5 to 30 g/10 min, measured in accordance with ISO 1133, and a viscosity number, measured in accordance with DIN 53 728, part 4, or ISO 1191, in the range from 100 to 450 cm³/g, preferably 120 to 280 cm³/g. The crystallinity is generally 35 to 80%, preferably 50 to 80%. The density, measured at 23° C. in accordance with DIN 53 479, method A, or ISO 1183, preferably lies in the range from >0.94 to 0.96 g/cm³. The melting point, measured with DSC (maximum of the melt curve, heating rate 20° C./min), preferably lies between 120 and 140° C. Suitable MDPE generally has an MFI (21.6 kg/190° C.) of greater than 0.1 to 50 g/10 min, preferably 0.6 to 20 g/10 min, measured in accordance with ISO 1133. The density, measured at 23° C. in accordance with DIN 53 479, method A, or ISO 1183, preferably lies in the range from >0.925 to 0.94 g/cm$^3$. The melting point, measured with DSC (maximum of the melt curve, heating rate 20° C./min), preferably lies between 115 and 135° C., preferably 115 to 130° C.

The inner cover layer and/or the outer cover layer may optionally contain further olefin polymers in small quantities, provided this does not disturb the functionality, in particular the gloss and roughness of the film on both sides essential to the invention.

The surface of the inner cover layer and/or of the outer cover layer is/are particularly advantageously subjected to a corona, plasma or flame treatment. This treatment improves the adhesive properties of the respective film surface for a subsequent decoration and printing, in other words the wettability with and the adhesion of printing inks and other decorating materials.

The layer thicknesses of the inner cover layer and of the outer cover layer are generally, in each case independently of one another, 0.1-10 µm, preferably 0.3 to 6 µm. Particularly advantageous embodiments have a thin outer cover layer, which is preferably <2 µm, in particular 0.2 to 1.8 µm, for example 0.5 to <1.5 µm thick. It has been found that this thin outer matt layer acts synergistically on the destackability of the film together with the outer intermediate layer yet to be described.

The inner cover layer and the outer cover layer may each additionally contain conventional additives described in part above, such as neutralising agents, stabilisers, antistatic agents, antiblocking agents and/or lubricants, in effective quantities in each case. The values below in % by weight relate to the weight of the respective cover layer. The type and quantity of such additive should be selected such that the gloss of the films on both sides remains in the required range.

Particularly suitable antiblocking agents are inorganic additives, such as silicon dioxide, calcium carbonate, magnesium silicate, aluminium silicate, calcium phosphate and the like and/or incompatible organic polymers, such as polyamides, polyesters, polycarbonates and the like, or cross-linked polymers, such as cross-linked polymethylmethacrylate or cross-linked silicone oils. Silicon dioxide and calcium carbonate are preferred. The mean particle size preferably lies between 1 and 6 µm, particular 2 and 5 µm. The preferred quantity of antiblocking agent lies in the range from 0.05 to 5% by weight, preferably 0.1 to 3% by weight, in particular 0.2 to 2% by weight.

Particularly suitable lubricants are higher aliphatic acid amides, higher aliphatic acid esters and metal soaps and also polydimethylsiloxanes. The preferred quantity of lubricants lies in the range from 0.01 to 3% by weight, preferably 0.02 to 1% by weight, in relation to the respective layer. The addition from 0.01 to 0.3% by weight aliphatic acid amides, such as erucic acid amide, or 0.02 to 0.5% by weight of polydimethylsiloxanes, in particular polydimethylsiloxanes with a viscosity from 5,000 to 1,000,000 mm$^2$/s, is particularly suitable.

Intermediate Layers

In addition, the film according to the invention comprises an inner intermediate layer, which is arranged between the base layer and the inner cover layer, and an outer intermediate layer, which is arranged between the base layer and the outer cover layer. The inner intermediate layer is in contact with the inner cover layer, and the outer intermediate layer is in contact with the outer cover layer. Preferred embodiments of the film thus have five layers.

The inner intermediate layer and the outer intermediate layer each contain, independently of one another, at least one polymer of at least one olefin, preferably at least one propylene polymer, in particular at least one propylene homopolymer. Furthermore, the inner intermediate layer and the outer intermediate layer each contain, independently of one another, the conventional additives described for the individual layers, such as antistatic agents, neutralising agents, lubricants and/or stabilisers and also optionally pigments. The intermediate layers generally do not contain any vacuole-initiating particles. This means that the intermediate layers are vacuole-free.

Preferred polymers of the intermediate layers are isotactic propylene homopolymers with a melting point from 140 to 170° C., preferably from 150 to 165° C., and a melt flow index (measurement ISO 1133 at 2.16 kg load and 230° C.) from 1.0 to 10 g/10 min, preferably from 1.5 to 6.5 g/10 min. The n-heptane soluble proportion of the polymer is generally 0.5 to 10% by weight, preferably 2 to 5% by weight, in relation to the starting polymer. For the purposes of the present invention, the highly isotactic or highly crystalline polypropylenes described above for the base layer can be used in the intermediate layers, and for example are advantageous for films having a thickness of less than 60 µm, preferably from 35 to 55, in particular 40 to 50 µm. Where appropriate, the use of HIPP in the intermediate layers can improve the rigidity of films having a particularly low density of the base layer.

Within the scope of the present invention however, it has been found that the films then also have the above-described good destacking properties when the intermediate layers are not formed from highly isotactic or highly crystalline propylene homopolymers of this type. Thus, propylene homopolymers with a regular isotacticity ($^{13}$C-NMR) from 90 to 96%, preferably 92 to <95%, can thus also be used for the intermediate layers, in particular for films with a thickness from >50 to 150 µm, preferably >55 to 100 µm.

The intermediate layers each contain 90-100% by weight of the described propylene polymers, preferably propylene homopolymers, and also where appropriate additionally the mentioned additives. In addition, the inner intermediate layer and the outer intermediate layer, in particular the outer intermediate layer, may contain pigments, in particular TiO$_2$, for example in a quantity from 2 to 8% by weight. The thickness of such intermediate layers is expediently greater than 0.5 µm and preferably lies in the range from 0.6 to 15 µm, in particular from 1.0 to 10 µm, for example from 1.5 to 8 µm, or from 1.5 to 6 µm.

Particularly advantageous embodiments have an outer intermediate layer, which contain 4.5 to 30% by weight, in particular 5 to 25% by weight TiO$_2$ and have a layer thickness from 0.5 to 5 µm, preferably 0.5 to <3 µm. Particularly advantageous embodiments have a thin outer cover layer of <2 µm, preferably >0 to <1.8 µm, for example 0.5 to <1.5 µm, on this thin outer intermediate layer with high pigment content.

It has been found that the roughness-increasing effect, known per se, of the TiO$_2$-containing intermediate layers surprisingly cooperates positively with a thin matt cover layer formed from incompatible polymers, such that the destacking behaviour of the film on the whole is significantly improved by this special layer combination.

It is suspected that this synergistic effect on the destackability results from the fact that, with a thin outer matt layer, the "inner" roughnesses come into effect by the pigmented outer intermediate layer and by the vacuole-containing base layer. The inner roughness is assumed to have an influence on the surface structure of the film outer side and cooperates synergistically with the special surface roughness by the incompatible polymers in the cover layer. According to the known teaching, particularly thick matt layers have a favourable effect on the destacking, since thicker matt layers normally lead to higher roughness values (see Examples 1 and 2 in WO 2010/121802). Within the scope of the present invention, the destackability could surprisingly be improved by a thin matt layer when this thin matt layer is applied to a thin intermediate layer with high $TiO_2$ content.

The total thickness of the film according to the invention is less 150 μm, preferably less than 100 μm, in particular at most 70 μm. On the other hand, it is preferably greater than 15 μm, preferably greater than 20 μm, in particular at least 25 μm. Here, the base layer, which is generally the thickest layer of the film, preferably accounts for 40 to 99% of the total film thickness. Where appropriate, the film may have further layers.

The film according to the invention is characterised inter alia by very good destackability. Within the scope of the present invention, a testing method was found which measures the separation force effective during destacking. It is known that films with similar roughness values can demonstrate differences with regard to the destacking behaviour (see Example 1 and Comparative Example 1 in WO 2009/052921). It has been found within the scope of the present invention that the separation force is a parameter that is suitable in practice as an indicator for good destacking behaviour. This separation force for destacking the film is preferably less than 20 N, preferably less than 18 N, particularly preferably less than 14 N, expediently less than 13 N, in particular less than 12 N. The lower limit for the separation force is generally at least 2 N, preferably at least 4 N, in particular 6 N. It is determined in accordance with the method described in greater detail in the experimental part, favourably at 25° C. Here, the separation force of the inner (or outer) cover layer of the film with respect to the outer (or inner) cover layer of the same film is measured.

The film according to the invention can be produced in a manner known per se, for example by a coextrusion method. Within the scope of this method, the melts corresponding to the individual layers of the film are coextruded at the same time and jointly through a sheet die, the film thus obtained is drawn off on one roll or more rolls for solidification, the multi-layer film is then stretched (oriented), the stretched film is heat fixed, and where appropriate is plasma-, corona- or flame-treated at the surface layer intended for treatment.

A biaxial stretching (orientation) can be carried out sequentially or simultaneously. The sequential stretching is generally carried out in succession, wherein the successive biaxial stretching, in which the film is first stretched longitudinally (in the machine direction) and then transversely (perpendicularly to the machine direction), is preferred. The film production will be described further on the basis of the example of flat film extrusion with subsequent sequential stretching.

As is usual in the extrusion method, the polymer or the polymer mixture of the individual layers is firstly compressed and liquefied conveniently in an extruder, wherein the optionally added additives may already be contained in the polymer or in the polymer mixture. The melts are then expediently pressed simultaneously through a sheet die (flat film die), and the pressed multi-layer film is conveniently drawn off on one or more take-off rolls, preferably at a temperature from 10 to 100° C., in particular 10 to 50° C., wherein the film is cooled and solidifies.

The film thus obtained is then generally stretched longitudinally and transversely to the direction of extrusion, which leads to an orientation of the molecule chains. The longitudinal stretching is preferably carried out at a temperature from 70 to 130° C., in particular 80 to 110° C., expediently with the aid of two rolls running at different speeds in accordance with the sought stretch ratio, and the transverse stretching is preferably carried out at a temperature from 120 to 180° C. with the aid of a corresponding tenter frame. The longitudinal stretch ratios conveniently lie in the range from 3 to 8, preferably 4 to 6. The transverse stretch ratios conveniently lie in a range from 5 to 10, preferably 7 to 9.

The stretching of the film is preferably followed by the heat fixing (heat treatment) of the film, wherein the film is conveniently held for approximately 0.1 to 10 s preferably at a temperature from 100 to 160° C. The film is then rolled up in the usual manner using a winding device.

Following the biaxial stretching of one or both surfaces of the film in accordance with one of the known methods, this/these is/are preferably plasma-, corona- or flame-treated. The treatment intensity generally lies in the range from 35 to 50 mN/m, preferably 37 to 45 mN/m.

The corona treatment is expediently performed such that the film is guided through between two conductor elements serving as electrodes, wherein a voltage, usually an AC voltage (for example 5 to 20 kV and 5 to 30 kHz), is applied between the electrodes and is high enough for spray or corona discharges to take place. Due to the spray or corona discharge, the air above the film surface is ionised and reacts the molecules of the film surface, such that polar dispersions are produced in the substantially unpolar polymer matrix.

The surface treatment, such as corona treatment, can be performed immediately during the production of the label film and also at a later moment in time, for example immediately before the printing process.

The film according to the invention is particularly suitable for use as a label in in-mould labelling methods. The use of the film according to the invention leads here to a significant improvement of the space-time yield of in-mould labelling methods, in particular due to the improved manageability when printing the film according to the invention, in particular the improved destackability thereof. Here, the destackability of the film can be improved further still as required, optionally by addition of powder, which is applied to the generally printed label and acts as a spacer so to speak, although this is generally not necessary.

The advantages of the improved destackability of the film according to the invention come into effect in particular in in-mould labelling methods in which a film according to the invention is initially printed by means of sheet-fed printing and the printed labels, once the film has been cut to size, are used in an in-mould labelling method in order to produce the labelled container.

The film according to the invention is surprisingly suitable both for injection moulding methods and for thermoforming methods, in particular with a low-sealing inner cover layer, in which the film participates in the actual shaping method of the container and is applied during this method and is part of the shaped container. The containers are generally produced from suitable propylene or ethylene polymers.

In this context, particularly advantageous injection moulding methods firstly comprise the removal of the individual labels, which where appropriate have been cut to size, from a stack, so that these can be placed in an injection mould. The mould is formed here such that the melt flow of the polymer is injected behind the label and the front side of the film rests against the wall of the injection mould. During the injection, the hot melt bonds to the label. After the injection, the mould is opened and the injection moulded article with label is ejected and cools. As a result, the label is to adhere to the container where possible without folds and in a visually faultless manner.

During injection, the injection pressure preferably lies in a range from 300 to 600 bar. The plastics used, in particular propylene polymers or polyethylenes, expediently have a melt flow index of around 40 g/10 min. The injection temperatures are dependent on the plastic used. In some cases, the mould is additionally cooled in order to prevent the injection moulded article from adhering to the mould.

Alternatively, a shaping by means of a thermoforming method is particularly advantageous. In the case of thermoforming, unoriented thick plastic panels, usually cast PP or PS (polystyrene), in a thickness of preferably approximately 200-750 µm, are heated and are drawn or pressed into an appropriate mould, preferably by means of vacuum or stamping tools. In this case also, the individual label is placed in the mould and bonds during the moulding process to the actual container. Significantly lower temperatures are generally used. Thus, low-sealing (inner cover layer) embodiments of the film according to the invention are preferred here as labels.

The present invention will be described in greater detail hereinafter by examples and a comparative example, although the inventive concept is not to be limited hereby.

Here, the following measuring methods were used to characterise the raw materials and the films:

Melt Flow Index

The melt flow index of the propylene polymers was measured in accordance with ISO 1133 at 2.16 kg load and 230° C., and at 190° C. and 21.6 kg for polyethylenes.

Melting Point

DSC measurement, maxima of the melt curve, heating rate 20 K/min.

Density

The density was determined in accordance with DIN 53 479, method A.

Roughness Measurement

As a measure for the roughness of the surfaces of the films, the roughness values Rz of the films were measured on the basis of DIN 4768, part 1 and DIN 4777 and also DIN 4772 and 4774 by means of a perthometer of the S8P type from the company Feinprüf Perthen GmbH, Göttingen, in accordance with the profiling method. The measuring head, a single-skid profiling system according to DIN 4772, was equipped with a stylus tip with the radius 5 µm and a flank angle of 90° at a stylus force from 0.8 to 1.12 mN and also a skid with radius 25 mm in the sliding direction. The vertical measurement range was set at 62.5 µm, the profiling distance was set to 5.6 mm, and the cutoff of the RC filter in accordance with DIN 4768/1 was set to 0.25 mm.

Gloss Measurement

The measurement was performed in accordance with DIN EN ISO 2813 at an angle of 60° at 25° C. As standard, a polished, dark-coloured glass pane with a refractive index of 1.567 (measured at a wavelength of 587.6 nm and 25° C.) was used, of which the gloss corresponded to 100 gloss units.

Separation Force Determination

A method for measuring the films was found which can demonstrate the differences in destacking behaviour of films under standardised conditions.

Within the scope of this test, the force that is required in order to move two films surfaces resting on one another in relation to one another is determined. In order to keep constant the film surfaces resting on one another, the film was wound around a wooden block 8.7 cm long and 5.7 cm wide.

This base area thus corresponded to the film measurement area. The block was 2.4 cm tall.

The wooden block was advanced into a passing film portion, and the film was fixed in the overlap region by heat sealing or adhesive tape. Two wooden blocks thus prepared were then stacked on one another. On a first block the inner cover layer of the film was then placed externally for example (alternatively the outer cover layer). On the second block the outer cover layer of the film was placed externally (alternatively the inner cover layer). In this way, the inner and outer cover layer of the film were resting against one another during the measurement.

The force acting in a film stack on a sheet arranged at the bottom was imitated in the test by a defined weight. A metal block of identical base area was therefore placed on the two wooden blocks advanced so as to rest on one another and had a weight of 1.0 kg.

The stack thus prepared with weight was then stored for 2 h at 70° C. After the storage time, the stack formed of the two wooden blocks and the weight was placed on a movable skid without displacing the three components relative to one another. The stack then rests on the skid in such a way that the lower wooden block is exposed at the lower face thereof, that is to say this film surface is only in contact with air. The wooden block arranged at the top was fixed on the transverse side thereof such that the block arranged at the bottom could be displaced relative to the upper block without also moving the block arranged at the top and the weight arranged thereon. The lower wooden block was pulled on the skid via a device. With a suitable load cell, it was then determined what force would be required in order to displace the lower block with respect to the upper wooden block to such an extent that the film surfaces would no longer be in contact, that is to say the lower block was removed from the stack (upper wooden block and weight) and the force required for this was measured.

EXAMPLE 1

Following the coextrusion method, a five-layered preliminary film was extruded from a flat film die. This preliminary film was drawn off on a chill roll, solidified and then oriented in the longitudinal and transverse direction and lastly fixed. The surface of the outer cover layer was pre-treated by means of corona in order to increase the surface tension. The five-layered film had a layered structure constituted by inner cover layer/inner intermediate layer/base layer/outer intermediate layer/outer cover layer. The individual layers of the film had the following composition:

Inner Cover Layer (2.3 µm):

65% by weight ethylene-propylene copolymer with a melting point of 135° C. and a melt flow index of 7.3 g/10 min at 230° C. and 2.16 kg load (ISO 1133)

35% by weight polyethylene with a density of 0.934 g/cm$^3$ and a melt flow index (190° C. and 21.6 kg) of 14.5 g/10 min.

Inner Intermediate Layer (4.0 μm)
  99.88% by weight propylene homopolymer (PP) with an n-heptane soluble proportion of 4.5% (in relation to 100% PP), a melting point of 165° C. and a melt flow index of 3.2 g/10 min at 230° C. and 2.16 kg load (ISO 1133)
  0.12% by weight erucic acid amide (ESA)
Base Layer (40.2 μm)
  85.95% by weight propylene homopolymer (PP) with an n-heptane soluble proportion of 4.5% by weight (in relation to 100% PP) and a melting point of 165° C. and a melt flow index of 3.2 g/10 min at 230° C. and 2.16 kg load (ISO 1133)
  14% by weight calcium carbonate with a mean particle diameter of 3.5 μm
  0.05% by weight erucic acid amide (ESA)
Outer Intermediate Layer (2.7 μm)
  94% by weight propylene homopolymer (PP) with an n-heptane soluble proportion of 4.5% by weight (based on 100% PP), a melting point of 165° C. and a melt flow index of 3.2 g/10 min at 230° C. and 2.16 kg load (ISO 1133)
  6% by weight $TiO_2$ with a mean particle diameter from 0.1 to 0.3 μm
Outer Cover Layer (0.8 μm):
  70% by weight ethylene-propylene copolymer with a melting point of 135° C. and melt flow index of 7.3 g/10 min at 230° C. and 2.16 kg load (ISO 1133)
  30% by weight polyethylene with a density of 0.934 g/cm³ and a melt flow index (190° C. and 21.6 kg) of 14.5 g/10 min All layers of the film additionally contained stabiliser and neutralising agent in conventional quantities.

More specifically, the following conditions and temperatures during production of the film were selected:
  extrusion: extrusion temperature approximately 250° C.
  chill roll: temperature 25° C.,
  longitudinal stretching: T 120° C.
  longitudinal stretching by a factor of 4.8
  transverse stretching: T=155°
  transverse stretching by a factor of 8
  fixing T=133° C.

The film was surface-treated on the surface of the outer cover layer by means of corona. The film had a density of 0.56 g/cm³ and a thickness of 50 μm.

EXAMPLE 2

A film according to Example 1 was produced with the following deviating layer thicknesses. The thickness of the outer cover layer was 0.5 μm, and the thickness of the outer intermediate layer was 2.1 μm. The thicknesses of the other layers and also the composition of all layers remained unchanged.

EXAMPLE 3

A film according to Example 1 was produced with the following deviating composition of the individual layers:
Inner Cover Layer (1.5 μm):
  35% by weight ethylene-propylene copolymer with a melting point of 135° C. and a melt flow index of 7.3 g/10 min at 230° C. and 2.16 kg load (ISO 1133)
  35% by weight polyethylene with a density of 0.934 g/cm³ and a melt flow index (190° C. and 21.6 kg) of 14.5 g/10 min.
  30% by weight ethylene-propylene-butylene copolymer with a melting point of 135° C. and a melt flow index of 5.5 g/10 min at 230° and 2.16 kg load (ISO 1133)

Inner Intermediate Layer (4.3 μm)
  99.88% by weight propylene homopolymer (PP) with an n-heptane soluble proportion of 4.5% by weight (based on 100% PP), a melting point of 165° C. and a melt flow index of 3.2 g/10 min at 230° C. and 2.16 kg load (ISO 1133)
  0.12% by weight erucic acid amide (ESA)
Base Layer (41.3 μm)
  84.95% by weight propylene homopolymer (PP) with an n-heptane soluble proportion of 4.5% by weight (based on 100% PP) and a melting point of 165° C. and a melt flow index of 3.2 g/10 min at 230° C. and 2.16 kg load (ISO 1133)
  15% by weight calcium carbonate with a mean particle diameter of 3.5 μm
  0.05% by weight erucic acid amide (ESA)
Outer Intermediate Layer (2.3 μm)
  94% by weight propylene homopolymer (PP) with an n-heptane soluble proportion of 4.5% by weight (based on 100% PP), a melting point of 165° C. and a melt flow index of 3.2 g/10 min at 230° C. and 2.16 kg load (ISO 1133)
  6% by weight $TiO_2$ with a mean particle diameter from 0.1 to 0.3 μm
Outer Cover Layer (0.6 μm):
  60% by weight ethylene-propylene-butylene copolymer with a melting point of 135° C. and melt flow index of 5.5 g/10 min at 230° C. and 2.16 kg load (ISO 1133)
  20% by weight ethylene-propylene copolymer with a melting point of 135° C. and a melt flow index of 7.3 g/10 min at 230° C. and 2.16 kg load (ISO 1133)
  20% by weight polyethylene with a density of 0.934 g/cm³ and a melt flow index (190° C. and 21.6 kg) of 14.5 g/10 min.

All the layers of the film additionally contained stabiliser and neutralising agent in conventional quantities.

COMPARATIVE EXAMPLE 1

A film according to Example 1 was produced with the following deviating composition of the individual layers:
Inner Cover Layer (0.5 μm):
  100% by weight ethylene-propylene copolymer with a melting point of 135° C. and a melt flow index of 7.3 g/10 min at 230° C. and 2.16 kg load (ISO 1133)
Inner Intermediate Layer (3.6 μm)
  100% by weight propylene homopolymer (PP) with an n-heptane soluble proportion of 4.5% by weight (in relation to 100% PP), a melting point of 165° C. and a melt flow index of 3.2 g/10 min at 230° C. and 2.16 kg load (ISO 1133)
Base Layer (39.1 μm)
  89% by weight propylene homopolymer (PP) with an n-heptane soluble proportion of 4.5% by weight (in relation to 100% PP) and a melting point of 165° C. and a melt flow index of 3.2 g/10 min at 230° C. and 2.16 kg load (ISO 1133)
  8.6% by weight calcium carbonate with a mean particle diameter of 3.5 μm
  2.4% by weight $TiO_2$ with a mean particle diameter from 0.1 to 0.3 μm
Outer Intermediate Layer (6.3 μm)
  96.4% by weight propylene homopolymer (PP) with an n-heptane soluble proportion of 4.5% by weight (based on 100% PP), a melting point of 165° C. and a melt flow index of 3.2 g/10 min at 230° C. and 2.16 kg load (ISO 1133)
  3.6% by weight $TiO_2$ with a mean particle diameter from 0.1 to 0.3 μm
Outer Cover Layer (0.5 μm):
  10% by weight ethylene-propylene copolymer with a melting point of 135° C. and a melt flow index of 7.3 g/10 min at 230° C. and 2.16 kg load (ISO 1133)

5% by weight polyethylene with a density of 0.937 g/cm³ and a melt flow index (190° C. and 21.6 kg) of 14.5 g/10 min 85% by weight ethylene-propylene-butylene copolymer with a melting point of 135° C. and a melt flow index of 5.5 g/10 min at 230° and 2.16 kg load (ISO 1133)

All layers of the film additionally contained stabiliser and neutralising agent in conventional quantities.

COMPARATIVE EXAMPLE 2

A film was produced as described in Example 1. In contrast to Example 1, no $TiO_2$ was added to the outer intermediate layer. The content of propylene homopolymer was increased accordingly to 100% by weight. The rest of the composition and the method conditions during production. of the film remained unchanged.

The roughness of this film results primarily from the thin matt cover layer and to a small extent from the vacuole-containing base layer and is Rz 1.9 µm, and the gloss is 58 units. The separation force is approximately 25 N. The destackability of the film is poor. This structure corresponds approximately to Comparative Example 2 of WO2009/052921.

COMPARATIVE EXAMPLE 3

A film was produced as described in Example 1. In contrast to Example 1, the layer thickness of the outer cover layer was increased to approximately 2.8 µm. In addition, no $TiO_2$ was added to the outer intermediate layer. The content of propylene homopolymer in the intermediate layer was increased accordingly to 100% by weight. The rest of the composition and the method conditions during production. of the film remained unchanged.

The roughness of this film increases due to the thicker matt layer compared to Example 2 to Rz to approximately 3.5 µm, and the gloss is 30 units. The separation force however is approximately 20 N. The destacking behaviour compared to Comparative Example 2 is thus improved by the thicker matt layer, however it was demonstrated that the destackability is not optimal without the inner roughness by $TiO_2$ in the intermediate layer.

COMPARATIVE EXAMPLE 4

A film was produced as described in Comparative Example 3. In contrast to Comparative Example 3, the layer thickness of the outer intermediate layer was increased to approximately 7 µm. This structure thus corresponds approximately to the films according to WO2009/052921 (Example 2). The rest of the composition and the method conditions during production of the film remained unchanged.

The roughness of this film decreases due to the thicker $TiO_2$-free outer intermediate layer compared to Comparative Example 3 to Rz approximately 2.5 µm, and the gloss is 51 units. The separation force is 26 N. The destacking behaviour compared to Comparative Example 2 and 3 is thus impaired by the thicker $TiO_2$-free outer intermediate layer. Here, there was no inner roughness.

COMPARATIVE EXAMPLE 5

A film was produced as described in Example 1. In contrast to Example 1, no PE was added to the outer cover layer. The content of propylene-ethylene copolymer was increased accordingly to 100% by weight. The rest of the composition and the method conditions during production of the film remained unchanged. The film demonstrates a low roughness of Rz approximately 1.5 µm and poor destackability due to the lack of a matt layer. The separation force is 25 N. The inner roughness caused by the intermediate layer with a high $TiO_2$ content of 6% by weight does not solve the problem. Gloss is 70 units.

COMPARATIVE EXAMPLE 6

A film was produced as described in Example 1. In contrast to Example 1, the outer intermediate layer was omitted, that is to say a four-layered film was produced. No polyethylene was added to the outer cover layer. The content of propylene-ethylene copolymer was increased accordingly to 100% by weight. The layer thickness of the outer cover layer was increased to 1.5 µm. The rest of the composition and the method conditions during production of the film remained unchanged. Gloss is 57 units. Due to the vacuole-containing base layer, the film demonstrates a roughness of Rz approximately 3.1 µm, but still a very poor destackability. The separation force is 30 N. The inner roughness caused by the base layer with a thin copolymer cover layer indeed increases the roughness values, but this inner roughness alone cannot solve the problem. This example additionally proves that films with comparable roughness Rz nevertheless may have different destacking behaviour.

The results of the measurements of the separation force on these films are summarised in the following table. For measurements 3 and 5 the respective outer cover layers were placed one on top of the other during the separation force measurement in order to examine the destacking behaviour of these surfaces relative to one another.

TABLE

| Measurement | Upper film/film side | Gloss [GE] | Rz [µm] | Lower film/film side | Gloss [GE] | Rz [µm] | Separation force [N] |
|---|---|---|---|---|---|---|---|
| 1 | Example 1/inner cover layer | 16 | 3.4 | Example 1/outer cover layer | 16 | 3.3 | 11 |
| 2 | Example 2/inner cover layer | 16 | 3.4 | Example 2/outer cover layer | 30 | 4.2 | 11 |
| 3 | Example 2/outer cover layer | 30 | 4.2 | Example 3/outer cover layer | 30 | 4.2 | 13 |
| 4 | Example 3/outer cover layer | 36 | 2.6 | Example 4/outer cover layer | 28 | 2.2 | 12 |
| 5 | Comparative Example 1/outer cover layer | 56 | 1.7 | Comparative Example/outer cover layer | 56 | 1.7 | 20 |
| 6 | Comparative Example 2/inner cover layer | 16 | 3.4 | Comparative Example 2/outer cover layer | 58 | 1.9 | 25 |

TABLE-continued

| Measurement | Upper film/film side | Gloss [GE] | Rz [μm] | Lower film/film side | Gloss [GE] | Rz [μm] | Separation force [N] |
|---|---|---|---|---|---|---|---|
| 7 | Comparative Example 3/inner cover layer | 16 | 3.4 | Comparative Example 3/outer cover layer | 30 | 3.5 | 20 |
| 8 | Comparative Example 4/inner cover layer | 16 | 3.4 | Comparative Example 4/outer cover layer | 51 | 2.5 | 26 |
| 9 | Comparative Example 5/inner cover layer | 16 | 3.4 | Comparative Example 5/outer cover layer | 70 | 1.5 | 25 |
| 10 | Comparative Example 6/inner cover layer | 16 | 3.4 | Comparative Example 6/outer cover layer | 57 | 3.1 | 30 |

The invention claimed is:

1. A multi-layered, opaque, biaxially oriented polyolefin film with a thickness of less than 150 μm, comprising
   a. a vacuole-containing base layer containing at least one polymer of at least one olefin,
   b. an inner intermediate layer containing at least one polymer of at least one olefin,
   c. an outer intermediate layer containing at least one polymer of at least one olefin,
   d. an inner cover layer, which is in contact with the inner intermediate layer, and
   e. an outer cover layer, which is in contact with the outer intermediate layer,
   wherein the specified quantities relate to the weight of the respective layer, wherein the outer intermediate layer has a thickness from 0.5 to 10 μm, wherein the inner cover layer and the outer cover layer, in each case independently of one another, contain 15-55% by weight of at least one polyethylene polymer and also 45-85% by weight of at least one propylene polymer, and
   the outer cover layer has a thickness from >0 to <10 μm and the film on both sides has a gloss of less than 50 gloss units measured in accordance with DIN EN ISO 2813 at an angle of 60° and at a temperature of 25° C.

2. The film according to claim 1, wherein the film on both sides has a gloss of than less than 40 gloss units measured in accordance with DIN EN ISO 2813 at an angle of 60° and at a temperature of 25° C. and said the pigment is TiO2.

3. The film according to claim 1, wherein the inner cover layer and the outer cover layer, each independently of one another, contain HDPE or MDPE.

4. The film according to claim 1, wherein the inner cover layer and the outer cover layer, each independently of one another, contain at least one ethylene-propylene copolymer, at least one propylene-butylene copolymer or at least one ethylene-propylene-butylene terpolymer.

5. The film according to claim 1, wherein the inner cover layer has a seal initiation temperature from 80 to 110° C.

6. The film according to claim 1, wherein the inner intermediate layer and the outer intermediate layer each contain at least one propylene homopolymer.

7. The film according to claim 1, wherein the inner intermediate layer and the outer intermediate layer each contain at least 70% by weight of at least one propylene homopolymer.

8. The film according to claim 1, wherein the base layer has a density of <0.6 g/cm³, and contains at least 70% by weight of a highly isotactic or highly crystalline propylene homopolymer.

9. The film according to claim 1, wherein the base layer has a density of preferably <0.55 g/cm³, and contains at least 70% by weight of a highly isotactic or highly crystalline propylene homopolymer.

10. The film according to claim 1, wherein the base layer contains at least 70% by weight of at least one highly isotactic or highly crystalline propylene polymer and the film has a thickness of <60 μm.

11. The film according to claim 1, wherein the thickness of the inner cover layer lies in the range from 0.1 to 10.0 μm.

12. The film according to claim 1, wherein the density of the film lies in a range from 0.2 to 0.80 g/cm³.

13. The film according to claim 1, wherein the film on both sides has a surface roughness Rz in a range of 2.0-6 μm with a cutoff of 0.25 mm.

14. The film according to claim 1, wherein the film on both sides has a surface roughness Rz in a range of 2.0-6 μm with a cutoff of 0.25 mm, and Rz values of the inner and the outer surface differ by at most 2 μm.

15. The film according to claim 1, wherein the separation force for destacking of the film is less than 20 N measured from a film side against a film side.

16. An in-mould label which comprises the film according to claim 1.

17. The film according to claim 1, wherein the outer cover layer has a thickness from >0 to <2 μm.

* * * * *